US009749136B2

(12) United States Patent
Leddy et al.

(10) Patent No.: US 9,749,136 B2
(45) Date of Patent: Aug. 29, 2017

(54) METHOD FOR WATERMARKING CONTENT

(75) Inventors: John Leddy, Bryn Mawr, PA (US);
James W Fahrny, Parker, CO (US);
Allen Broome, Broomfield, CO (US);
Michael A. Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 809 days.

(21) Appl. No.: 13/404,440

(22) Filed: Feb. 24, 2012

(65) Prior Publication Data

US 2013/0227293 A1   Aug. 29, 2013

(51) Int. Cl.
| | |
|---|---|
| *H04L 29/06* | (2006.01) |
| *H04L 9/32* | (2006.01) |
| *H04N 1/32* | (2006.01) |
| *H04N 21/00* | (2011.01) |
| *H04N 21/41* | (2011.01) |
| *H04N 21/4627* | (2011.01) |
| *H04N 21/8352* | (2011.01) |
| *H04N 21/8358* | (2011.01) |
| *H04N 21/845* | (2011.01) |

(52) U.S. Cl.
CPC ........... *H04L 9/32* (2013.01); *H04N 1/32304* (2013.01); *H04N 21/00* (2013.01); *H04N 21/4126* (2013.01); *H04N 21/4627* (2013.01); *H04N 21/8352* (2013.01); *H04N 21/8358* (2013.01); *H04N 21/845* (2013.01); *H04N 21/8456* (2013.01); *H04L 2209/608* (2013.01); *H04N 2201/3239* (2013.01)

(58) Field of Classification Search
CPC ............... H04L 9/32; H04L 2209/6608; H04L 2201/3239; H04N 1/32304; H04N 21/00; H04N 21/4126; H04N 21/4627; H04N 21/8352; H04N 21/8358; H04N 21/845; H04N 21/8456
USPC .............. 713/163, 168, 176; 726/26, 27, 30; 705/51, 57
See application file for complete search history.

(56) References Cited

U.S. PATENT DOCUMENTS

| | | | | |
|---|---|---|---|---|
| 6,209,094 | B1 * | 3/2001 | Levine et al. ................ | 713/176 |
| 6,430,301 | B1 * | 8/2002 | Petrovic ........................ | 382/100 |
| 6,865,677 | B1 * | 3/2005 | Echizen et al. .............. | 713/176 |
| 2001/0029580 | A1 * | 10/2001 | Moskowitz ................... | 713/176 |
| 2002/0116618 | A1 * | 8/2002 | Muratani ...................... | 713/176 |
| 2002/0181732 | A1 * | 12/2002 | Safavi-Naini et al. ....... | 382/100 |
| 2003/0009669 | A1 * | 1/2003 | White et al. ................. | 713/176 |
| 2003/0056101 | A1 * | 3/2003 | Epstein ........................ | 713/176 |
| 2003/0081779 | A1 * | 5/2003 | Ogino .......................... | 380/207 |
| 2003/0101172 | A1 * | 5/2003 | De La Huerga ................ | 707/3 |
| 2004/0095377 | A1 * | 5/2004 | Salandro ....................... | 345/723 |
| 2005/0010536 | A1 * | 1/2005 | Cochran et al. ............... | 705/76 |
| 2005/0025463 | A1 * | 2/2005 | Bloom et al. .................. | 386/96 |
| 2005/0050332 | A1 * | 3/2005 | Serret-Avila et al. ........ | 713/176 |
| 2005/0086480 | A1 * | 4/2005 | Kerr et al. .................... | 713/176 |

(Continued)

*Primary Examiner* — Sarah Su

(74) *Attorney, Agent, or Firm* — Banner & Witcoff, Ltd.

(57) ABSTRACT

The disclosure relates to processing content with watermarks to generate watermarked versions. In some aspects, each version may be different. Groups of fragments may be combined to generate a unique stream by pulling fragments from two or more of the groups of fragments. Further, fragmenting may be performed before watermarking, and fragments may be pulled and watermarked upon request.

25 Claims, 11 Drawing Sheets

(56) References Cited

U.S. PATENT DOCUMENTS

| | | | |
|---|---|---|---|
| 2005/0097329 A1* | 5/2005 | Morimoto | G06T 1/0021 713/176 |
| 2006/0200673 A1* | 9/2006 | Zhang | H04L 63/126 713/176 |
| 2006/0239501 A1* | 10/2006 | Petrovic et al. | 382/100 |
| 2007/0206793 A1* | 9/2007 | Staring et al. | 380/202 |
| 2010/0011061 A1* | 1/2010 | Hudson et al. | 709/204 |
| 2010/0082804 A1* | 4/2010 | Patel et al. | 709/224 |
| 2010/0169652 A1* | 7/2010 | Butler | 713/176 |
| 2010/0211798 A1* | 8/2010 | Fahrny | 713/189 |
| 2010/0250267 A1* | 9/2010 | Brenner et al. | 705/1.1 |
| 2010/0281051 A1* | 11/2010 | Sheffi et al. | 707/770 |
| 2011/0246434 A1* | 10/2011 | Cheenath et al. | 707/703 |
| 2012/0117214 A1* | 5/2012 | Mengle et al. | 709/223 |
| 2012/0308071 A1* | 12/2012 | Ramsdell et al. | 382/100 |
| 2013/0219182 A1* | 8/2013 | Barnes et al. | 713/176 |

* cited by examiner

METHOD FOR WATERMARKING CONTENT

FIELD OF ART

The features described herein relate generally to systems that track or control access to content. Some aspects relate to watermarking of content.

BACKGROUND

As technology improves, access to content is increasing. People can now use more than just their televisions to access content. Computers, smartphones, and other electronic devices are capable of displaying content. Furthermore, an increasing amount of people are accessing content, and an increasing amount of content is being generated. But, while improvements in technology have brought about more content, they have also allowed for more piracy. One of the highest priorities of content providers is to ensure that content is not leaking out to, for example, non-customers or onto public networks, such as the Internet. Personal computers, televisions, and many mobile devices have security profiles that are somewhat less secure than devices, such as digital set-top boxes of content providers. Such security profiles may be inadequate to prevent or deter piracy.

One way to deter or prevent piracy is to use watermarks. Watermarks may be used in video content to identify the origin of the digital content and/or render the video content unusable or undesirable. However, it is difficult to uniquely watermark video content while maintaining cachability across many customers who acquire such video content from a single network caching structure. In the past, methods of creating a unique watermark in the end client/customer device have been proposed. That is, personal computers, televisions, or set-top boxes could be modified to create a unique watermark in the received content. However, such a proposed solution appears to be difficult to implement and expensive to develop and operate. More specifically, this proposed solution may limit the types of client devices capable of watermarking the video content or may require that a wide array of watermarking technologies be supported by the client devices. In other words, each new client device must support some type of watermarking process to gain access to the video content. Such implementation is often out of the control of the content provider because, for example, the providers may not have the ability to require electronic device manufacturers to produce devices with adequate watermarking capability. Therefore, a demand exists for a method in which a unique watermark can be provided for content.

SUMMARY

Some or all of the various features described herein assist in preventing or deterring piracy, and/or in reducing the inconvenience to users (such as service providers, content owners, device manufacturers, and end users). In particular, some of the systems described herein provide the ability to create forensic marking for preventing or deterring content leakage.

In accordance with one illustrative embodiment, the disclosure relates to a method, which can be executed on a processor, comprising obtaining content, watermarking the content with first and second watermarks to generate first and second watermarked versions, fragmenting each of the plurality of watermarked versions to generate a plurality of groups of fragments, and generating a unique stream by pulling fragments from two or more of the plurality of groups of fragments. Further, it is disclosed that fragmenting may be performed before watermarking to produce the groups of watermarked fragments. Also, the disclosure relates to a computing device, including a processor, and a memory, storing instructions that, when executed by the processor, cause the computing device to perform steps of the method.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
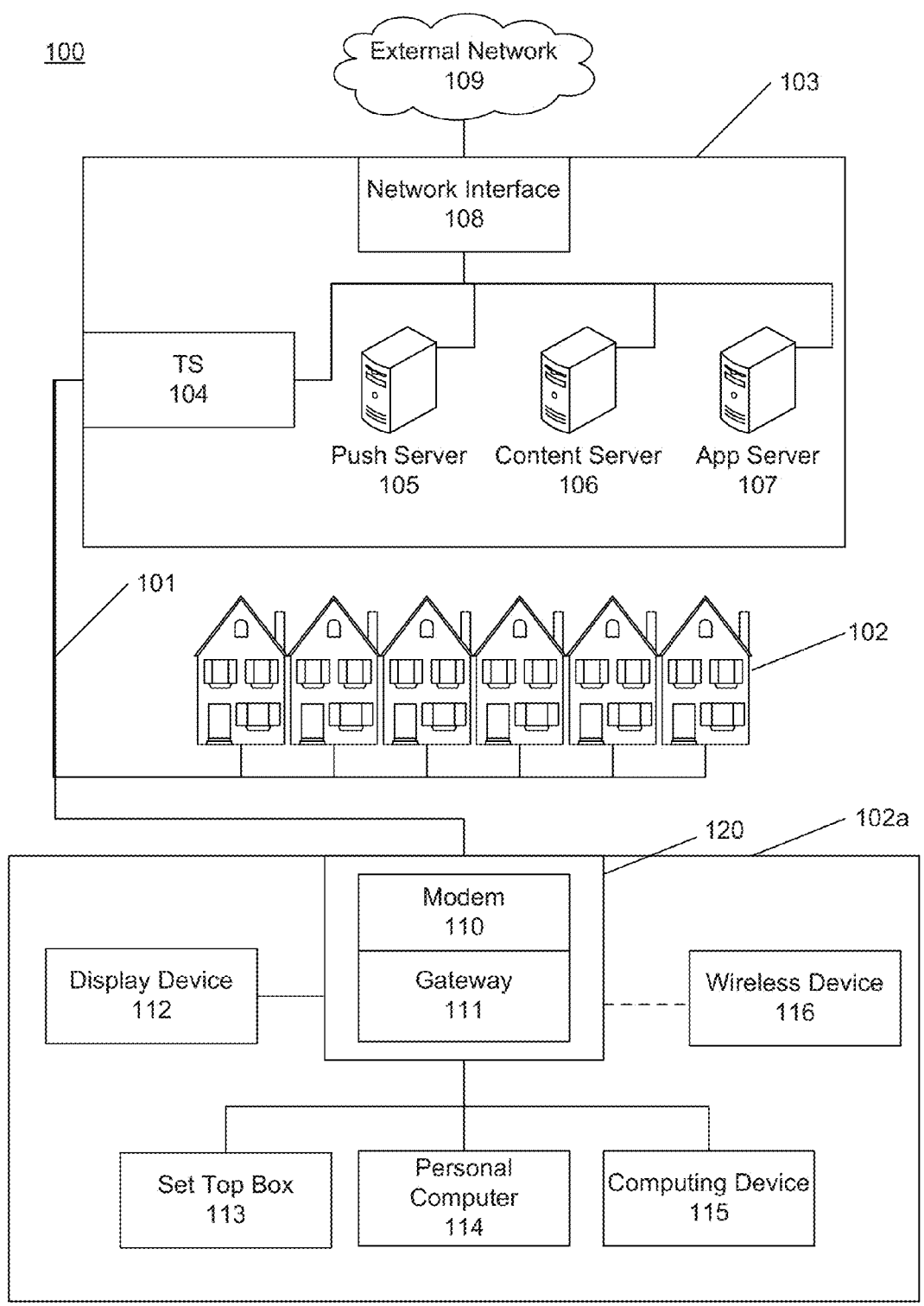
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications) . The central office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain fragmenters, streamers, and packagers utilized to implement the methods disclosed herein.

An example premises 102a, such as a home, may include an interface 120. For example, the interface 120 may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the central office 103 and other devices beyond the central office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as televisions 112, additional STBs 113, personal computers 114, laptop computers 115, wireless devices 116 (wireless laptops, notebooks, tablets and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
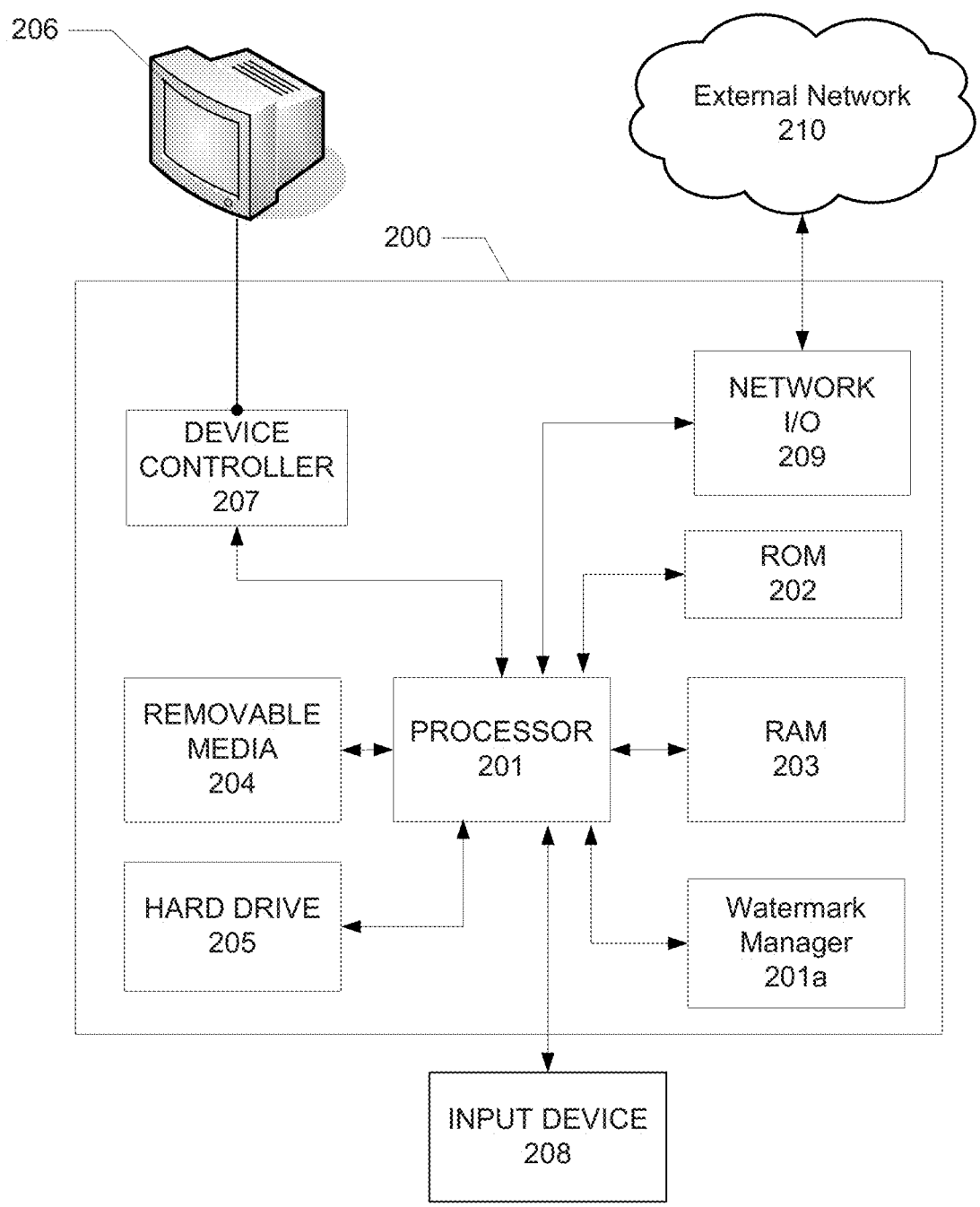
FIG. 2 illustrates an example computing hardware and software configuration that can be used to implement any of the methods, servers, entities, and computing devices described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, for the watermarking process described herein, the computing device 200 may include a watermark manager 201a, which can perform the various watermarking functions described herein as a replacement for, or augment to, any other processor 201 that the computing device 200 may include. That is, the watermark manager 201a may include a separate set of computer-executable instructions stored on a computer-readable medium that, when executed by a processor (e.g., processor 201), cause the processor (or the computing device 200 as a whole) to perform the various watermarking functions described herein. The watermark manager 201a may also include internal secure memory (not shown), which can store the various watermarks, watermarking factors, and files described herein. The secure memory can be any desired type of memory, and can have enhanced security features to help restrict access (e.g., can only be accessed by the watermark manager 201a, can be internal to the watermark manager 201a, etc.). Where the watermark manager 201a includes a separate set of computer-executable instructions, these instructions may be secured such that only authorized users may be allowed to modify, augment, or delete them.

In some embodiments, the watermark manager 201a may be implemented as an application specific integrated circuit (ASIC). That is, the watermark manager 201a may be a chip designed specifically for performing the various watermarking functions described herein. Further, the ASIC may be implemented within or in communication with various computing devices provided herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
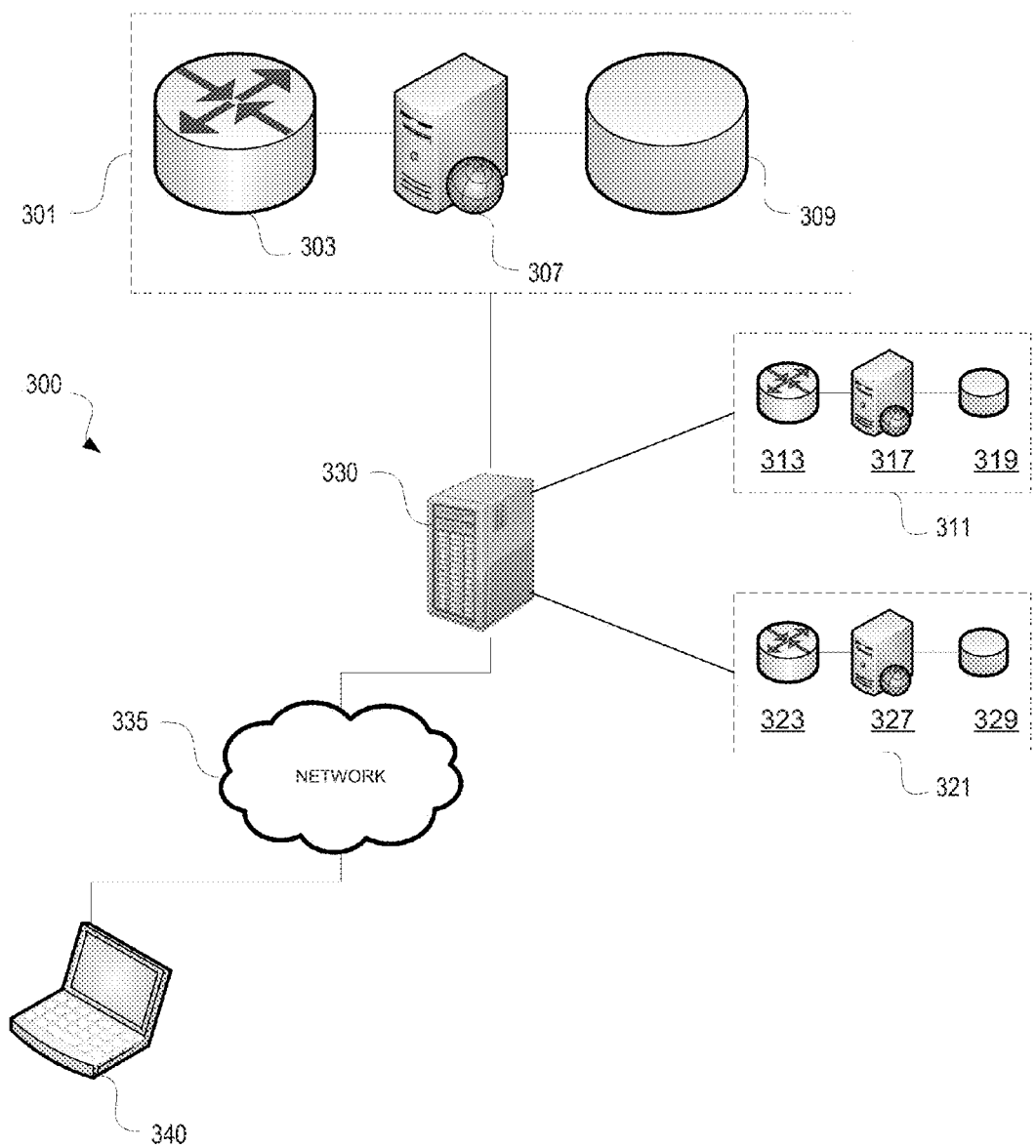
FIG. 3 illustrates a system architecture according to one or more illustrative aspects described herein.

Referring to FIG. 3, various features described herein may be implemented within a system architecture 300, including a plurality of content delivery networks (CDN) 301, 311, and 321 interconnected by one or more networks 335 (e.g., an IPTV network). Further, a load balancer 330 may be implemented into the system architecture 300 to distribute requests for content among the CDNs 301, 311, and 321 according to bandwidth and other congestion management considerations. Thus, a single payload (e.g., data for a single movie) may be provided by a plurality of CDNs. Each CDN 301, 311, 321 may include a router 303, 313, 323, whose purpose is to receive requests from end users and route them to edge servers within its network; a set of edge servers 307, 317, 327; and a content database 309, 319, 329, which centralizes storage of content that the respective CDN 301, 311, 321 manages. Although shown separately, one of ordinary skill in the art will appreciate that the routers 303, 313, and 323, the edge servers 307, 317, and 327, and the content databases 309, 319, and 329 may be combined. Further, here the CDNs 301, 311, and 321 are shown generally, and it will be understood that they may each contain fragmenters, streamers, and packagers utilized to implement the methods disclosed herein.

In some embodiments, a CDN (e.g., CDNs 301, 311, and 321) may cache certain content (e.g., video content) to improve the efficiency of accessing such content. In particular, it may be desirable to provide a CDN that caches content so that customers can make Hypertext Transfer Protocol (HTTP) requests to acquire content in an efficient manner over networks (e.g., IPTV networks). But, including the content in such a CDN may result in that content being more vulnerable to piracy. Accordingly, watermarks may be applied to the content to deter or prevent piracy.

For illustrative and explanatory purposes, only a single requesting entity 340 is depicted in FIG. 3. However, a plurality of requesting entities may connect to the network 335, and in turn request content from one or more of the CDNs 301, 311, 321.

Using the system architecture 300, each video stream transferred to a requesting entity 340 may be uniquely watermarked and a file may be created and stored for subsequent identification of the uniquely watermarked video stream. Furthermore, the system architecture 300 may be configured to support requests made in accordance with any number of protocols, such as the Hypertext Transfer Protocol (HTTP).

Figure 4:
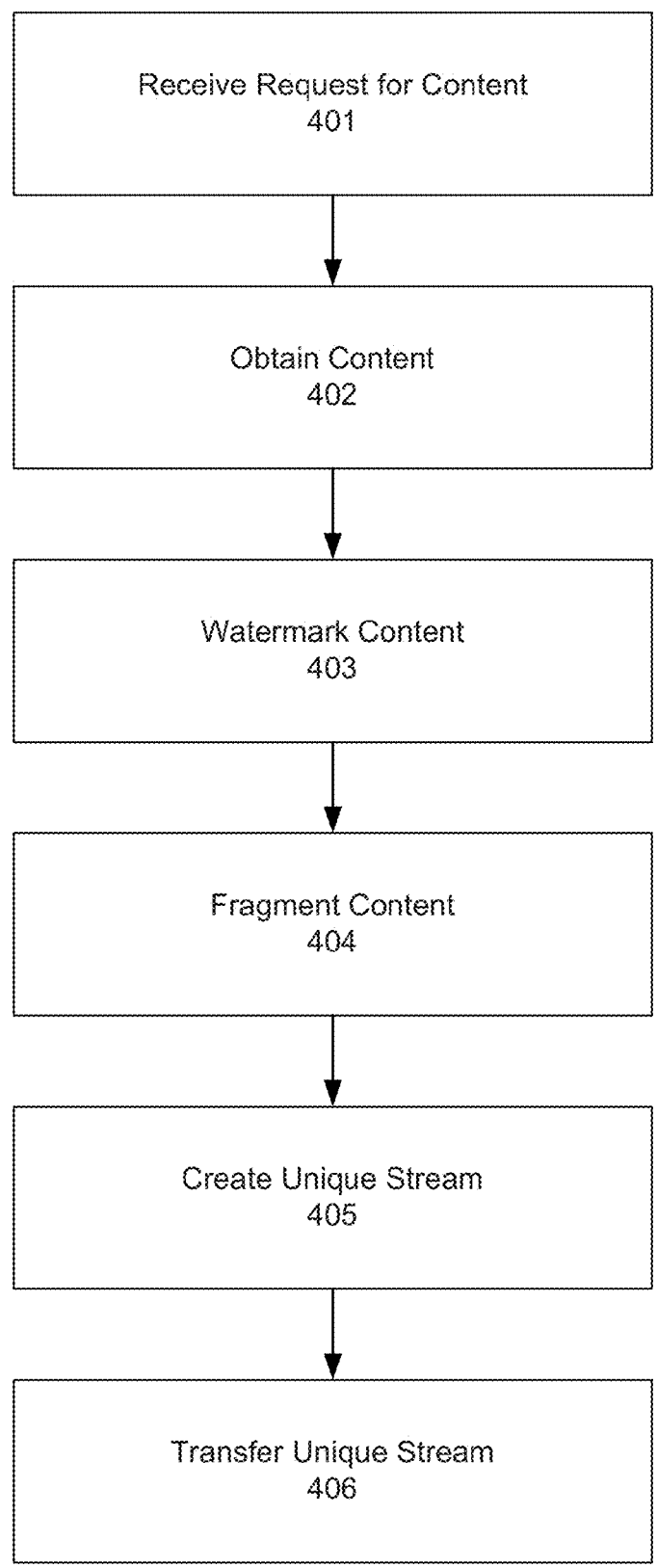
FIG. 4 is a flow diagram of a method according to one or more aspects of the disclosure.

FIG. 4 is a flow diagram illustrating an illustrative method of the present application. The steps in FIG. 4 may be performed by one or more of the above discussed devices. However, for convenience, the steps in FIG. 4 are described as being performed by the watermark manager 201a of FIG. 2.

In step 401, a request for content may be received. Here, the request may be generated by a user (e.g., customer) via a requesting entity (e.g., a laptop computer 115 of FIG. 1) or by an administrator of a CDN (e.g., a CDN 301 of FIG. 3). Moreover, the request may be generated automatically, for example, by a processor programmed to initiate the method of FIG. 4. Additionally, the request may be in the form of any of a number of different protocols. For example, the request may be an HTTP request. Further, various forms of content may be requested. The content may be audio content, image content, video content, or audio video (AV) content. Accordingly, the content may be in a number of different formats, such as, but not limited to, JPEG, GIF, TIF, BMP, AIFF, MP3, WAV, WMA, MPEG, AVI, DV, DivX, WMV, etc.

Once a request for content is received in step 401, the appropriate content is obtained in step 402. In other words, in step 402, the content corresponding to the request received in step 401 is searched for and obtained. The content may be obtained from, for example, a secure storage medium within a CDN (e.g., a CDN 301 of FIG. 3). Before obtaining the appropriate content, the request may be checked to determine whether the request was made by an authorized/approved user or authorized/approved requesting entity. If the request is not made from an authorized/approved user or entity, the content may not be obtained. In this manner, distribution of content to an unauthorized/unapproved user or requesting entity may be prevented or reduced.

Next, in step 403, the obtained content is watermarked. More specifically, in this embodiment, at least two versions of the obtained content are generated such that each version includes a different watermark. For example, a first watermark is embedded in the obtained content to generate first watermarked content, and a second watermark, which is different from the first watermark, is embedded in the obtained content to generate second watermarked content. Although only two watermarked versions are discussed here, more than two versions may be generated. Moreover, each version may contain a plurality of watermarks, so long as each watermarked version is unique. The watermarks used may be stored in a memory and accessed when needed. Alternatively, the watermarks may be generated when needed. Herein, the watermarks used may be of a variety of forms, including, but not limited to, metadata (e.g., time, date, user ID number, etc.), images, audio signals, audio-video signals, text, etc. Also, in any given instance of step 403, the same form of watermark may be used or different forms may be used. For example, the content obtained in step 402 may be watermarked with two different images to generate two different watermarked versions, or may be watermarked with an image to generate one watermarked version and metadata to generate another watermarked version.

Further, a watermark may be embedded using one or more of a number of different processes for embedding a watermark. For example, step 403 may embed a watermark by changing the DCT coefficients, changing pixel intensities, or adding digital data. Herein, watermarking refers generally to an act of marking or otherwise modifying content (e.g., digital data, analog data, etc.) for various purposes, such as tracking the content, authenticating the content, and/or identifying the source of the content. Also, certain watermarking processes may be used depending on the format of the content to be watermarked. One of ordinary skill in the art will appreciate the different watermark embedding processes available so as to be able to identify an appropriate watermark embedding process for the given content and watermark.

In step 404, each watermarked version of the content is fragmented. That is, the digital stream that forms the watermarked version of the content is divided up to form a plurality of fragments. The digital stream may be divided up evenly, such that each fragment is the same size (i.e., contains the same number of bits). For example, where the content is a video, the video stream may be fragmented into same-sized fragments. In other words, each fragment may represent, for example, a 2 second interval of a video stream. Alternatively, it is also possible to divide the digital stream into fragments of various sizes. One of ordinary skill in the art will appreciate the different fragmentation processes available so as to identify an appropriate fragmentation process for the given content.

While FIG. 4 shows step 404 being performed after step 403, the order of these steps may be switched. That is, the fragmentation process of step 404 may be performed before the watermarking process of step 403. In such a case, all fragments are watermarked with two or more unique watermarks to generate two or more watermarked versions. For example, if a video stream is fragmented into five fragments, each of the five fragments may be watermarked with a first watermark to generate five first watermarked fragments and each of the five fragments may be watermarked with a second watermark, which is different from the first watermark, to generate five second watermarked fragments. Accordingly, two uniquely watermarked versions of the five fragments are generated.

Once the uniquely watermarked versions are generated, step 405 is initiated to create a unique stream. More specifically, fragments are pulled from the plurality of watermarked versions to create a unique stream. In this manner, a unique stream may be created for each user or requesting entity. For example, when two separate requesting entities request the same content, a first stream comprising a first fragment with a first watermark and a second fragment with a second watermark may be created for one requesting entity, while a second stream comprising the first fragment with the second watermark and the second fragment with the first watermark may be created for the other requesting entity. As a result, unique streams may be created for each different requesting entity or for each different request, even from the same requesting entity.

In step 406, the unique stream generated in step 405 is transferred to a user or requesting entity. For example, referring to FIG. 3, the unique stream may be transferred from the CDN 301 through the network 335, which may be an IPTV network, to a requesting entity 340. Similar to the request received in step 401, the unique stream may be transferred in the form of any of a number of different protocols, such as HTTP. Also, the unique stream may be transferred to the same user or requesting entity from which the request is received in step 401.

Furthermore, while FIG. 4 shows that the content is obtained, watermarked, and fragmented and that a unique stream is created after a request is made in step 401, this is not necessarily the case. One of ordinary skill in the art will appreciate that one or more of steps 402, 403, 404, and 405 may be performed in advance of receiving a request. For example, it is contemplated that unique streams could be constructed ahead of time and stored, thereby allowing for later delivery/transfer upon request.

Figure 5:
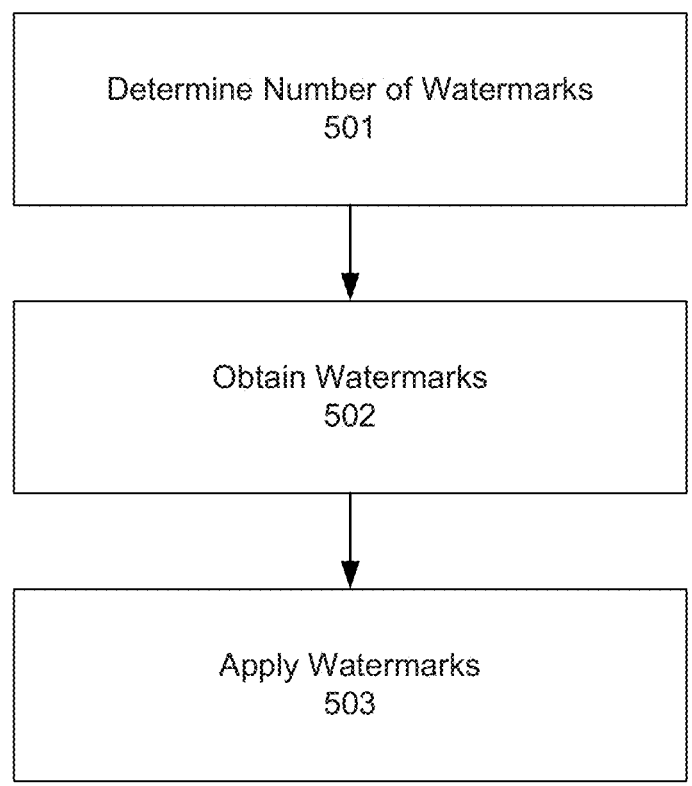
FIG. 5 is a flow diagram of a watermarking process according to one or aspects of the disclosure.

FIG. 5 is a flow diagram illustrating an illustrative embodiment of a watermarking process, such as for step 403 in FIG. 4. FIG. 5 shows an example of a number of sub-steps that may be performed during the watermarking process of step 403 in FIG. 4. Referring to FIG. 5, step 501 is first performed to determine a number of watermarks to be used. The number of watermarks may be a predetermined number that is set by an administrator or stored in memory. Alternatively, the number of watermarks may be determined based on the number of fragments to be generated or number of fragments already generated, the size of the content to be watermarked (which may be related to, for example, the duration of a video), the number of users or requesting entities making requests within a particular time period (including simultaneous requests), and/or the total number of possible users or requesting entities. In order to determine the total number of possible users (e.g., customers) or requesting entities in step 501, the network may be searched or memory may be accessed in which the number of users or requesting entities is stored. Additionally, the number of watermarks to be used may be capped based upon an expected number of requests for particular content. Also, the number of watermarks to be used may be capped for a particular period of time.

Once the number of watermarks to be used is determined in step 501, the watermarks are obtained in step 502. The watermarks to be used may be obtained, for example, by selecting watermarks stored in a secure memory. The watermarks may be randomly selected or may be the first watermarks in a queue that maintains a plurality of available watermarks. Alternatively, the watermarks may be generated at the time they are to be obtained. That is, in step 502, a number of watermarks corresponding to the number of watermarks determined in step 501 may be generated. As discussed above, various types of watermarks may be used. For example, in step 502, a watermark with the current date and time may be generated. Also, the watermark may include identification information, which may correspond to the content being watermarked, the content provider, the author, etc.

Next, in step 503, the obtained watermarks are applied to the requested content. Here, a number of copies or versions of the requested content are generated and a different watermark is applied to each copy/version. As a result, a plurality of uniquely watermarked versions of the requested content is generated. In step 503, as discussed above, any of a number of different watermark embedding procedures may be implemented. That is, applying a watermark may comprise various methods, such as changing DCT coefficients, changing pixel intensities, adding digital data, etc.

Figure 6:
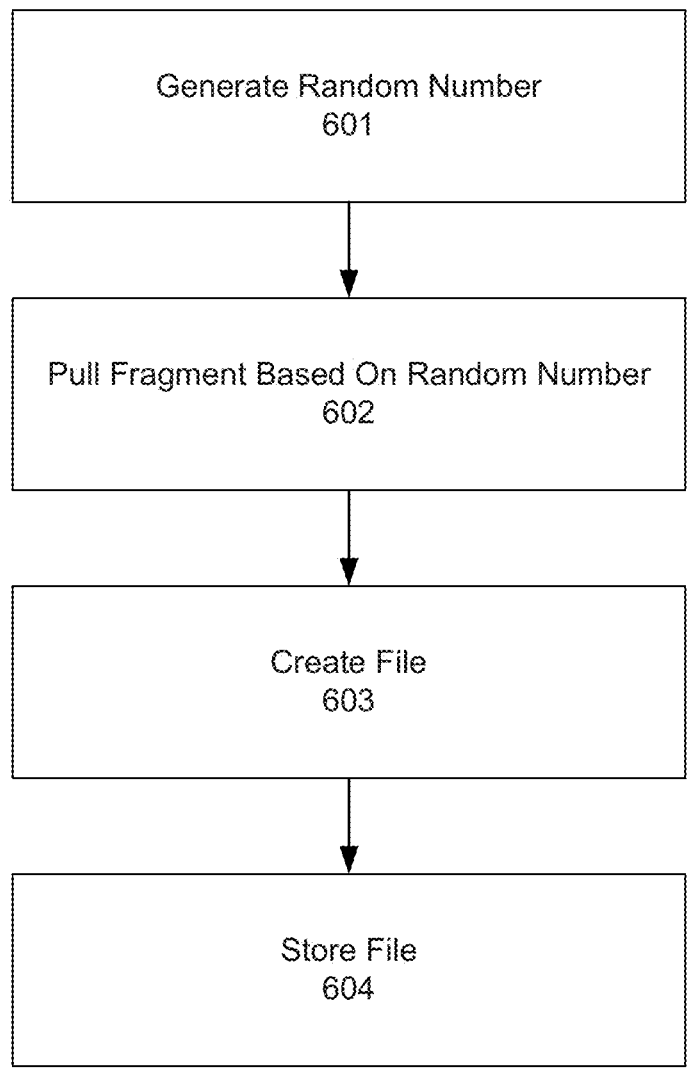
FIG. 6 is a flow diagram of a method according to one or more aspects of the disclosure.

FIG. 6 is a flow diagram illustrating an illustrative embodiment for creating content according to the disclosure, such as in step 405 in FIG. 4. FIG. 6 shows an example of a number of sub-steps that may be performed during the stream creation process of step 405 in FIG. 4. Referring to FIG. 6, step 601 is first performed to generate one or more random numbers or other units. Here, random numbers may be generated using an internal clock or may be obtained from an external circuit. In some embodiments, the random number may be generated using an IP address of a requesting entity or a timestamp of a request for content. Herein, it should be understood that a random number does not have to be truly random, but may be generated according to an algorithm, such that the numbers produced by the algorithm appear to be statistically random. In other words, the random numbers described herein may be pseudo-random numbers.

Figure 7A:
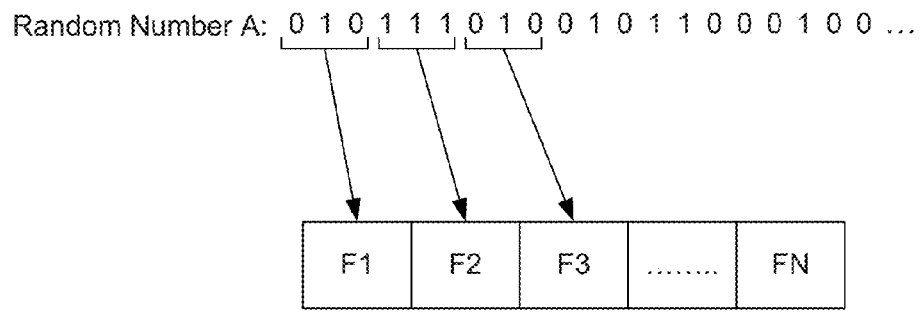
FIGS. 7A-7C are diagrams illustrating various methods of selecting fragments.

Referring to FIG. 7A, step 601 may produce a single random number Random Number A. The single random number (e.g., Random Number A) may include a relatively large number of bits. Then, subsets of the plurality of bits may be used to indicate which one of a plurality of watermarked versions should be used for a particular fragment. For example, the three most significant bits of Random Number A may be used for a first fragment, the next three most significant bits may be used for a second fragment, and so on. Although FIG. 7A shows that three bit subsets are used to determine the watermarked version for each fragment, the number of bits in the subsets may be any positive integer (1, 2, 3, 4, etc.). Moreover, the number of bits in each subset may vary. For example, three bits may be used to determine the first fragment, while four bits may be used to determine the second fragment.

Figure 7B:
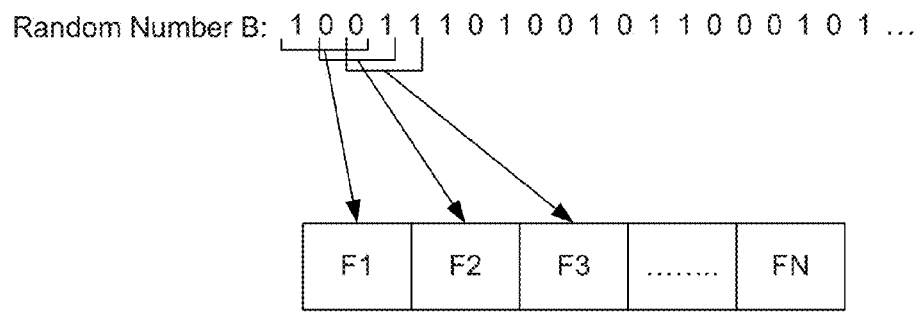

In some embodiments, each bit from a single random number generated in step 601 may be used to determine more than one fragment. For example, as shown in FIG. 7B, the first three most significant bits of a random number (e.g., Random Number B) may be used to determine the first fragment, while the second to fourth most significant bits of the same random number (e.g., Random Number B) may be used to determine the second fragment. Thus, the second and third most significant bits may be used to determine both the first fragment and the second fragment.

Figure 7C:
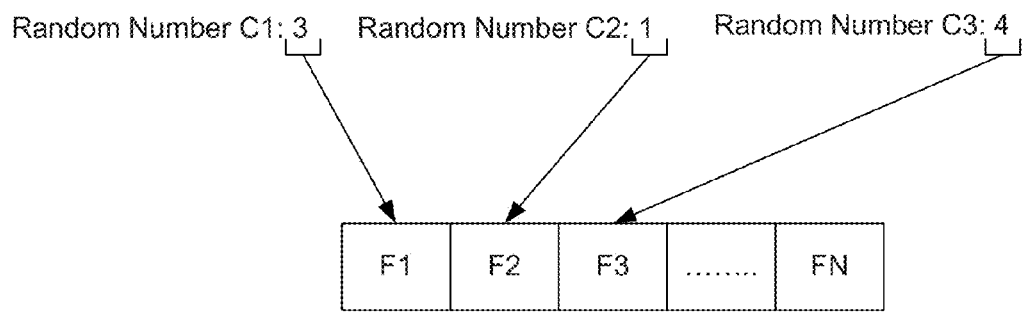

Alternatively, step 601 may generate a plurality of random numbers (e.g., Random Numbers C1, C2, C3) as shown in FIG. 7C. Each random number may be used to determine a respective fragment. In some embodiments, the random number may have a value between 1 and N, where N is equal to or greater than the number of watermarked versions of the same requested content. For example, if there are five watermarked versions of the requested content, then each of the random numbers generated may have a value between 1 and 5.

FIGS. 7A-7C provide just a few ways that random numbers may be generated. In light of FIGS. 7A-7C, it should be understood that various methods of generating random numbers for use in pulling fragments are contemplated.

Once the random number(s) is generated in step 601, step 602 is performed to create a unique stream using the random number(s). More specifically, in step 602, fragments from the plurality of watermarked versions are pulled to form a unique portion of content into a stream and the random number indicates which watermarked version a particular fragment is to be pulled from. In this manner, a unique stream (or other portion of content for transmission) is created from randomly pulling fragments from a number of watermarked versions.

In one or more embodiments, the random number may be a series of binary digits, and the value of the binary digits, or a subset thereof, may indicate from which watermarked version each of the fragments is to be pulled from. For example, the random number may comprise a number of binary digits, where a '0' digit indicates that the fragment should be pulled from one watermarked version and a '1' digit indicates that the fragment should be pulled from the other watermarked version. Accordingly, if there are two watermarked versions of the content and the random number is 1011, where a '1' indicates the first watermarked version and a '0' indicates the second watermarked version, then a unique stream may be created by pulling the first fragment from the first watermarked version, the second fragment from the second watermarked version, the third fragment from the first watermarked version, and the fourth fragment from the first watermarked version.

Although the embodiment of FIG. 6 shows that one or more random numbers are generated in a single instance of step 601, other embodiments are not limited to such process flow. Rather, steps 601 and 602 may be repeated a number of times to generate random numbers and pull fragments on a fragment-by-fragment basis until the whole unique stream is created.

After the unique stream is created, step 603 is initialized to create a file for later identification of the unique stream. The file may contain customer information to identify the customer or requesting entity that is to receive the unique stream. Additionally, the file may contain pattern information, which indicates the pattern that was used to generate the unique stream. One way to indicate the pattern that was used, is to maintain the one or more random numbers used.

Subsequently, the file is stored in step 604. The file may be stored in an internal or external memory device. Further, the file may be indexed according to the user or requesting entity. In this manner, it can be determined which users or requesting entities received which unique streams.

Figure 8:
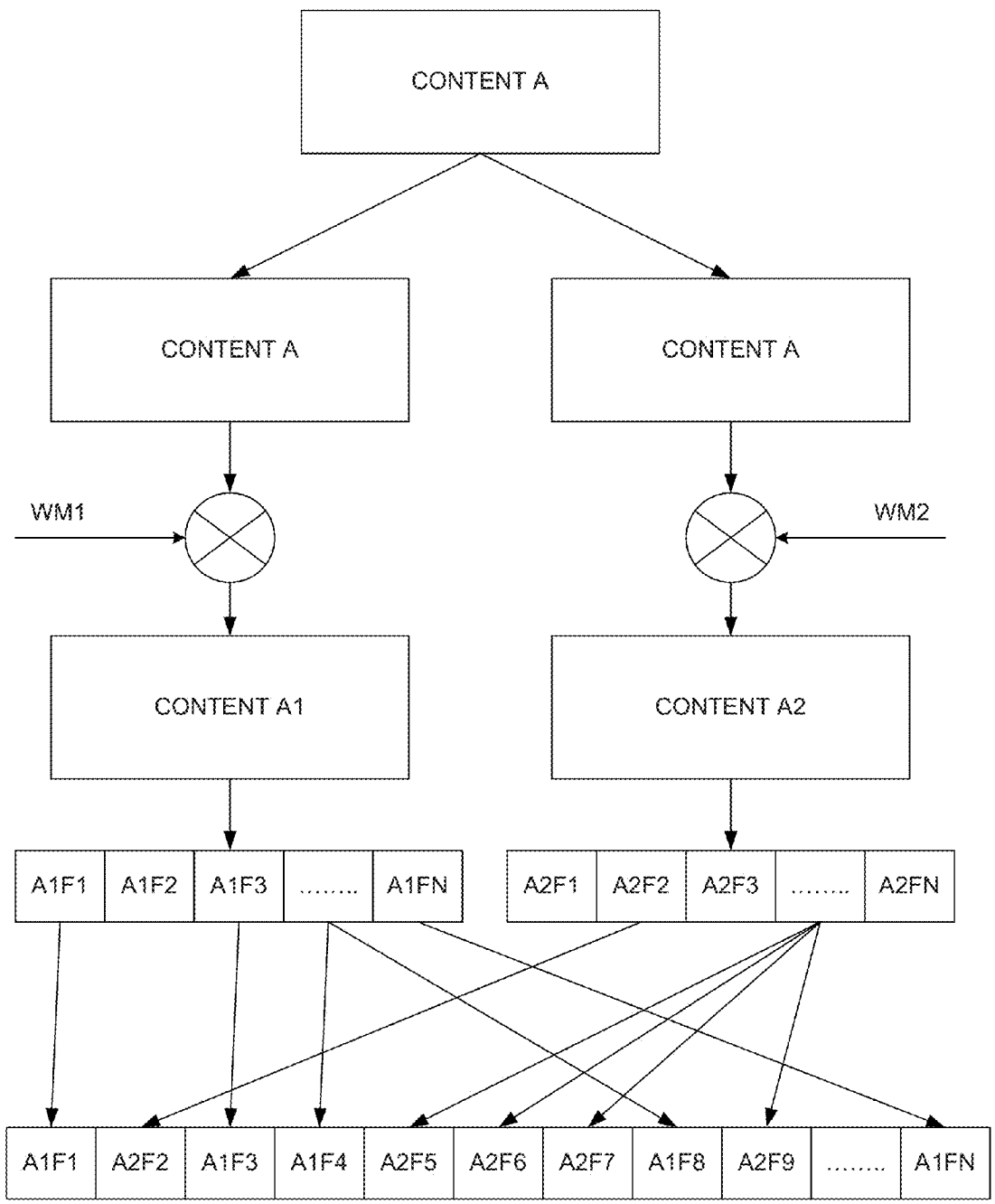
FIG. 8 is a block diagram of an illustrative embodiment for creating a stream.

FIG. 8 is a high-level block diagram illustrating an illustrative embodiment of the creation of a unique stream. In particular, FIG. 8 illustrates how content, such as audio video content, such as Movie A, may be watermarked and fragmented to produce a unique audio video stream. As shown in FIG. 8, two copies/versions of Movie A are first obtained. Then, one copy of Movie A is associated, e.g., embedded, with a first watermark WM1, while the other copy of Movie A is associated, e.g., embedded, with a second watermark WM2. As a result, two watermarked versions Movie A1 and Movie A2 are generated. Next, each watermarked version is fragmented into an N number of fragments. More specifically, Movie A1 is fragmented to produce A1F1 to A1FN fragments, while Movie A2 is fragmented to produce A2F1 to A2FN fragments. The number of fragments N may be determined based on various factors, such as the size of the content (which may be related to, for example, the duration of a video). FIG. 8 then shows an example of how fragments from the different watermarked versions may be pulled together to generate a unique audio video stream. The unique audio video stream can then be transferred to a particular device or user.

Figure 9:
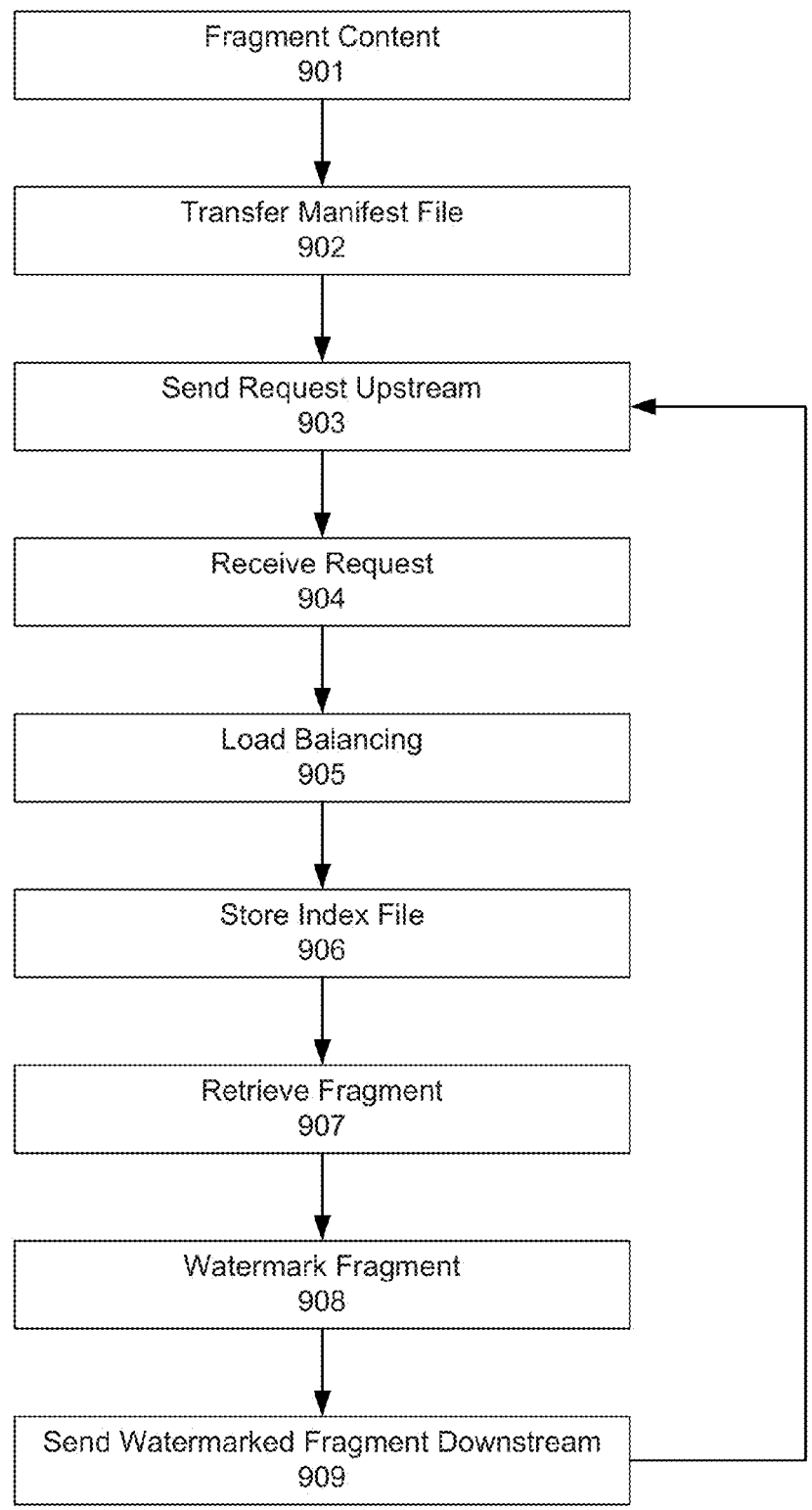
FIG. 9 is a flow diagram of a method according to one or more aspects of the disclosure.

FIG. 9 is a flow diagram illustrating an illustrative method of the present disclosure. The steps in FIG. 9 may be performed by one or more of the above discussed devices.

In step 901, content (e.g., IPTV), which is to be made available to users, may be fragmented. That is, the content, which may be a stream of data, may be divided into a plurality of fragments. The content may be divided up evenly, such that each fragment is the same size (i.e., contains the same number of bits). Alternatively, the content may be divided up unevenly, such that the plurality of fragments have various sizes (i.e., various amounts of bits). In any case, the fragments may be stored in one or more content databases (e.g., content databases 309, 319, and 329) of a CDN (e.g., CDNs 301, 311, 321).

In step 902, one or more manifest files are transferred downstream to users that may request content, e.g., from a CDN. Such manifest files are particularly useful in an adaptive/dynamic content delivery system. The manifest files may be generated by a fragmenter and may be stored at the fragmenter and/or at one or more content databases (e.g., content databases 309, 313, and 329) of a CDN (e.g., CDNs 301, 311, and 321). Further, the manifest files may include instructions for user devices (or requesting entities) to pull fragments. In some embodiments, the manifest files may specify various rates and patterns for instructing the user devices when to request fragments and/or which fragments to request. Additionally, the manifest files may indicate which codec was used to compress the content and which bitrates and resolutions are available.

After a user device receives a manifest file, the user device sends a request for a particular fragment(s) upstream at step 903. The request may be an HTTP request and may include an IP address of the requesting user device, a session ID, user device properties (e.g., browser type, browser version, etc.), acceptable response types, a timestamp, a geolocation, etc.

In step 904, the request for the particular fragment may be received. In some embodiments, the request may be received by a load balancer (e.g., load balancer 330) and/or another network element including the watermark manager 201*a*. Then, load balancing may be performed at step 905. That is, the load balancer 330 or other similar device may determine which database (e.g., content databases 309, 319, and 329), or other content storing device, should provide the particular fragment requested. In some embodiments, the load balancer 330 may utilize congestion management tools to determine which database can most efficiently process the request. The load balancer 330 may evaluate the provisioned bandwidth and data rate of channels connected to the databases to determine which database should receive the request.

Further, in some embodiments, the load balancer 330 may use the IP address, session ID, etc. of the received request to determine which backend CDN (e.g., CDNs 301, 311, and 321) should be used to respond to the received request. The load balancer 330 may distribute the received requests evenly across the number of accessible CDNs.

Additionally, or alternatively, the load balancer 330 may randomly select a CDN. For example, the load balancer 330 may use random numbers, as described above with reference to FIGS. 7A-7C, in order to randomly select a CDN. Once a CDN is selected, the load balancer 330 forwards the received request to the selected CDN.

Meanwhile, the load balancer 330 or other similar device used for distributing the requests may also store an indication of its selection at step 906. That is, the load balancer 330 may create a log that stores a record of each request it forwards. Each entry in the log may identify the user device that sent the request (e.g., may identify the IP address of the requesting user device) and the particular address (e.g., the URL) that the load balancer 330 forwarded the request to. The log may store information identifying requested fragments, the corresponding CDN selected to provide the requested fragment, and other information such as the date and time of the request. Subsequently, the log may be collected and analyzed to determine which watermarked fragments were sent to a given user device.

Further, the information stored may be indexed according to user identification information (User ID), and may be organized into index files so that all of the fragments received by a particular user device may be easily identified. Below, Table 1 illustrates how an example index file may store data. As shown in Table 1, the user identification (USER ID) may be a binary number representing a respective user device or requesting entity. Meanwhile, the index file may store information indicating a particular fragment (e.g., Fragments 1, 2, and 3) for a particular content (e.g., Content A) that was requested by each user. In the example Table 1, the index file shows that each user has requested the same fragments for the same content. Table 1 further shows that index files may store which database was selected to provide the particular fragment for the particular user. Where there are, for example, ten databases storing Content A (and therefore storing Fragments 1, 2, and 3 of Content A), the ten databases may be respectively designated as Databases 0-9.

TABLE 1

| USER ID | CONTENT/FRAGMENT | SELECTED DATABASE |
|---|---|---|
| 001 | Content A/Fragment 1 | Database 7 |
|  | Content A/Fragment 2 | Database 8 |
|  | Content A/Fragment 3 | Database 6 |
| 010 | Content A/Fragment 1 | Database 0 |
|  | Content A/Fragment 2 | Database 5 |
|  | Content A/Fragment 3 | Database 3 |
| 011 | Content A/Fragment 1 | Database 4 |
|  | Content A/Fragment 2 | Database 9 |
|  | Content A/Fragment 3 | Database 1 |
| 100 | Content A/Fragment 1 | Database 7 |
|  | Content A/Fragment 2 | Database 2 |
|  | Content A/Fragment 3 | Database 3 |
| 101 | Content A/Fragment 1 | Database 8 |
|  | Content A/Fragment 2 | Database 2 |
|  | Content A/Fragment 3 | Database 6 |

As shown in Table 1, different databases may be used to pull fragments, such that no two users pull the same three fragments from the same three databases. For example, referring to Table 1, both user 001 and user 100 receive Fragment 1 from Database 7. However, user 001 and user 100 receive the other fragments (i.e., Fragments 2 and 3) from different databases. Thus, each user may pull fragments in a unique way. By storing this information in index files, content may be later compared with the index files to determine the source of the content (i.e., the user devices that originally requested and received the content). It should be understood that Table 1 is provided to reflect the relationship between information stored in an index file, and that numerous methods of storing and organizing the information are contemplated.

In step 907, the request forwarded by the load balancer 330 in step 906 may be processed. That is, a CDN (e.g., CDNs 301, 313, 321) may decode the request to determine the particular fragment of content requested and may search for the fragment in a content database (e.g., content databases 309, 319, 329). Once the particular fragment is located, the CDN may retrieve a copy of the fragment. Also at step 907, the CDN may create a log that stores a record of each request it receives. Each entry in the log may identify the user device that sent the request (e.g., may identify the IP address of the requesting user device) and the particular address (e.g., the URL) accessed. The log may also record other information such as a date and time of the request.

In step 908, the fragment retrieved in step 907 may be watermarked with one or more watermarks. In some embodiments, one of the watermarks may be based on information provided in the request. For example, a fragment may be watermarked with a watermark that includes the IP address found within the request for the particular watermark. Further, the watermark(s) embedded in the fragment may be a watermark associated with a particular database (e.g., a watermark indicating a provider of the database). In other words, the watermark embedded into the fragment may be indicative of the database that the watermark was retrieved from. In some embodiments, all fragments provided by a certain database may be watermarked with a specific watermark. Alternatively, all fragments provided by a certain database may be watermarked with at least one from among a set of watermarks associated with the certain database. Also, in some embodiments, the watermark may be randomly selected from a group of potential watermarks. Because the load balancer 330 determines where to retrieve the request after it is sent from the user devices, the user devices may not have access to information indicating which database was the source of the fragment. Reducing access to information regarding which databases the fragments are received from may reduce access to information regarding what watermark was embedded, and therefore, may help in upholding the integrity of the watermarking system.

Figure 10:
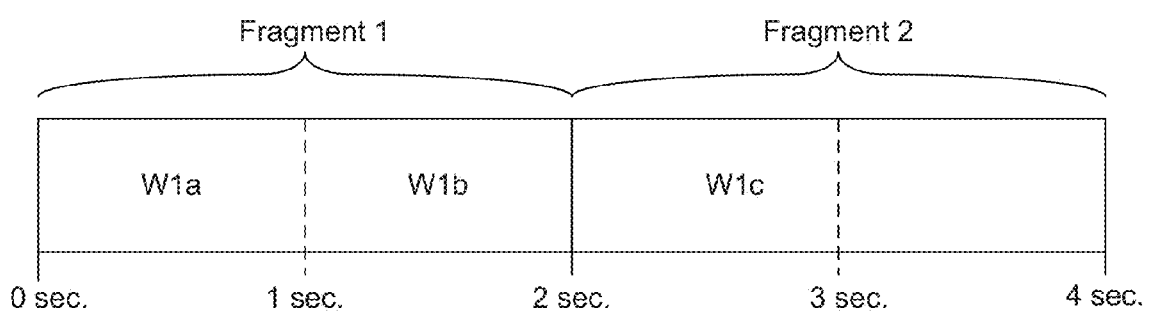
FIG. 10 is a diagram illustrating an example method of watermarking.

Any of the watermarking methods described above with reference to step 403 may be performed at step 908. In some embodiments, only a portion of the watermark may be embedded in a particular requested fragment. This may be the case where the fragment requested is too small (i.e., does not include enough bits) to be embedded with the watermark. For example, referring to FIG. 10, a watermark W1 may be too large to be completely embedded into a fragment Fragment 1. As shown in FIG. 10, content is divided into fragments (Fragment 1 and Fragment 2) representing two second intervals. Further, only a portion (e.g., 1 bit) of the watermark W1 may be embedded into each second of the content. Here, however, the watermark W1 is too large (e.g., watermark W1 may include 3 bits) to be embedded into two seconds of the content. FIG. 10 shows that a first portion W1$a$ of the watermark W1 is embedded into the $1^{st}$ one-second interval of the content, a second portion W1$b$ of the watermark W1 is embedded into the $2^{nd}$ one-second interval of the content, and a third portion W1$c$ of the watermark W1 is embedded into the $3^{rd}$ one-second interval of the content. Accordingly, only a portion (i.e., W1$a$ and W1$b$) of the watermark W1 is embedded into the first two-second interval fragment (Fragment 1).

Returning to FIG. 9, the watermarked fragment is transferred downstream to the requesting entity at step 909. In some embodiments, steps 903 through 909 may be repeated, after step 909 is performed. Further, the initiation of step 903 may be determined based on information contained in the manifest file received at step 902. As explained above, the manifest file may dictate the rate at which fragments are to be requested.

In some embodiments, step 903 may be initiated before the end of step 909. That is, step 903 may be performed a second time to send a second request before the process of FIG. 9 reaches step 909. In some cases, step 903 may be performed more than twice before step 909 is performed. Furthermore, the fragments requested in step 903 do not have to be sequential. In other words, step 903 may request a fragment of video content that corresponds to a later portion of the video content before requesting a fragment of video content that corresponds to an earlier portion of the video content.

It should be understood that the process flow of FIG. 9 is just one example, and that the steps therein may be reordered. For example, step 908 may be performed immediately after step 901 so that the fragmented content is immediately watermarked and stored. In such cases, step 908 would not have to be performed again after the fragment is retrieved in step 907.

Figure 11:
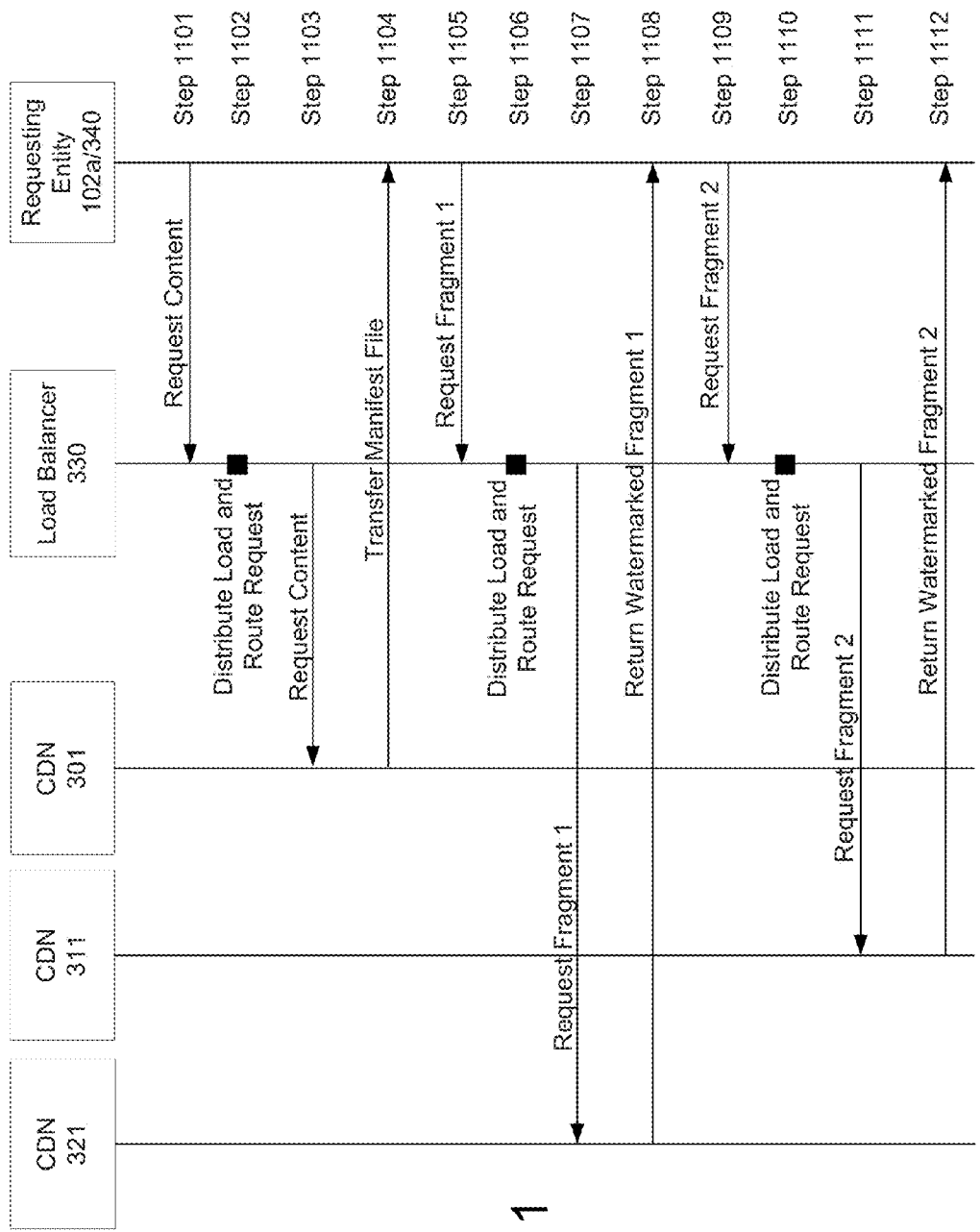
FIG. 11 is a diagram showing an example of the transfer of data in accordance with one or more aspects of the disclosure.

FIG. 11 is a high-level diagram showing the transfer of data between different elements of a system in accordance with the present disclosure. The first transfer of data may include a request for specific content sent upstream from the requesting entity 340 (or premises 102$a$) in step 1101. The request for content may be received by the load balancer 330, which may evaluate network congestion and determine where to route the request for content in step 1102. Then, in step 1103, the request for content may be forwarded to, for example, the CDN 301. In response to receiving the request for content, the CDN 301 may transfer the manifest file corresponding to the requested content back to the requesting entity 340 at step 1104. Although in this example the CDN 301 provides the manifest file, it should be understood that any of the CDNs 301, 311, 321 may provide the manifest file. Next, in step 1105, the requesting entity 340 may transfer a request for Fragment 1 based on information obtained from the manifest file. Upon receiving the request, the load balancer 330 may determine which CDN to forward the request to at step 1106 and forward the request to the selected CDN 321 at step 1107. Then, the CDN 321 returns a watermarked version of Fragment 1 to the requesting entity 340 at step 1108. In step 1109, the requesting entity 340 transfers a request for Fragment 2 based on information obtained from the manifest file. The load balancer 330 again evaluates the network to determine which CDN to forward the request to at step 1110. And, in step 1111, the load balancer 330 forwards the request for Fragment 2 to CDN 311. Next, the CDN 311 returns a watermarked version of the Fragment 2 to the requesting entity 340 at step 1112.

Although example embodiments are described above, the various features and steps may be combined, divided, omitted, and/or augmented in any desired manner, depending on the specific secure process desired. This patent should not be limited to the example embodiments described, but rather should have its scope determined by the claims that follow.

We claim:

1. A method implemented by one or more computing devices, the method comprising:
    fragmenting, by one of the one or more computing devices, content to generate a plurality of fragments;
    receiving a first request for the content;
    selecting a first watermark based on an Internet Protocol (IP) address associated with the first request;
    applying at least a portion of the first watermark to at least a portion of a first fragment from among the plurality of fragments to generate a watermarked first fragment;
    applying at least a portion of a second watermark to at least a portion of a second fragment from among the plurality of fragments to generate a watermarked second fragment, the second fragment being different from the first fragment and the second watermark being different from the first watermark; and
    providing a copy of the content comprising the watermarked first fragment and the watermarked second fragment.

2. The method of claim 1, wherein the receiving the first request for the content comprises:
    receiving, from a remote client device, a first request for the first fragment.

3. The method of claim 2, further comprising:
    receiving, from the remote client device, a second request for the second fragment; and
    selecting the second watermark based on the second request.

4. The method of claim 2, further comprising:
    receiving, from another remote client device, a second request for the first fragment; and
    selecting a third watermark based on at least one of an IP address associated with the second request, a session identifier associated with the second request, or a timestamp associated with the second request.

5. The method of claim 1, further comprising:
    applying at least a portion of a third watermark to at least a portion of the first fragment, the third watermark being different from the first watermark and the second watermark.

6. The method of claim 1, further comprising:
    applying at least a portion of the first watermark to at least a portion of a third fragment, wherein the portion of the first watermark in the third fragment is different from the portion of the first watermark in the first fragment.

7. The method of claim 1, further comprising:
    outputting a manifest file, including a fragment pattern indicating time periods that define the first fragment and the second fragment.

8. The method of claim 1,
wherein the providing the copy of the content comprises:
    using load balancing to select a content database from among a plurality of content databases in response to the first request;
    forwarding the first request to the selected content database; and
    transmitting the watermarked first fragment to a remote client device.

9. The method of claim 8, wherein the using load balancing comprises:
    evaluating congestion of channels connected to the plurality of content databases; and
    selecting one of the plurality of content databases associated with a channel having a least amount of congestion.

10. A method implemented by one or more computing devices, the method comprising:
    fragmenting, by one of the one or more computing devices, content to generate a plurality of fragments;
    receiving a first request for the content;
    selecting a first watermark based on a session identifier associated with the first request;
    applying at least a portion of the first watermark to at least a portion of a first fragment from among the plurality of fragments to generate a watermarked first fragment;
    applying at least a portion of a second watermark to at least a portion of a second fragment from among the plurality of fragments to generate a watermarked second fragment, the second fragment being different from the first fragment and the second watermark being different from the first watermark; and
    providing a copy of the content comprising the watermarked first fragment and the watermarked second fragment.

11. The method of claim 10, wherein the receiving the first request for the content comprises:
    receiving, from a remote client device, a request for the first fragment.

12. The method of claim 11, further comprising:
    receiving, from the remote client device, a second request for the second fragment; and
    selecting the second watermark based on the second request.

13. The method of claim 11, further comprising:
    receiving, from another remote client device, a second request for the first fragment; and
    selecting a third watermark based on at least one of an IP address associated with the second request, a session identifier associated with the second request, or a timestamp associated with the second request.

14. The method of claim 10, further comprising:
    outputting a manifest file, including a fragment pattern indicating time periods that define the first fragment and the second fragment.

15. The method of claim 10, wherein the providing the copy of the content comprises:
    using load balancing to select a content database from among a plurality of content databases in response to the first request;

forwarding the first request to the selected content database; and transmitting the watermarked first fragment to a remote client device.

16. The method of claim 15, wherein the using load balancing comprises:

evaluating congestion of channels connected to the plurality of content databases; and selecting one of the plurality of content databases associated with a channel having a least amount of congestion.

17. The method of claim 10, further comprising storing an index file comprising information that a user device was sent the first fragment with the first watermark and the second fragment with the second watermark.

18. A method implemented by one or more computing devices, the method comprising:

fragmenting, by one of the one or more computing devices, content to generate a plurality of fragments;

receiving a first request for the content;

selecting a first watermark based on a time stamp associated with the first request;

applying at least a portion of the first watermark to at least a portion of a first fragment from among the plurality of fragments to generate a watermarked first fragment;

applying at least a portion of a second watermark to at least a portion of a second fragment from among the plurality of fragments to generate a watermarked second fragment, the second fragment being different from the first fragment and the second watermark being different from the first watermark; and providing a copy of the content comprising the watermarked first fragment and the watermarked second fragment.

19. The method of claim 18, wherein the receiving the first request for the content comprises:

receiving, from a remote client device, a request for the first fragment.

20. The method of claim 19, further comprising:

receiving, from the remote client device, a second request for the second fragment; and selecting the second watermark based on the second request.

21. The method of claim 19, further comprising:

receiving, from another remote client device, a second request for the first fragment; and selecting a third watermark based on at least one of an IP address associated with the second request, a session identifier associated with the second request, or a timestamp associated with the second request.

22. The method of claim 18, further comprising:

outputting a manifest file, including a fragment pattern indicating time periods that define the first fragment and the second fragment.

23. The method of claim 18, wherein the providing the copy of the content comprises:

using load balancing to select a content database from among a plurality of content databases in response to the first request;

forwarding the first request to the selected content database; and transmitting the watermarked first fragment to a remote client device.

24. The method of claim 23, wherein the using load balancing comprises:

evaluating congestion of channels connected to the plurality of content databases; and selecting one of the plurality of content databases associated with a channel having a least amount of congestion.

25. The method of claim 18, further comprising storing an index file comprising information that a user device was sent the first fragment with the first watermark and the second fragment with the second watermark.

* * * * *

UNITED STATES PATENT AND TRADEMARK OFFICE
CERTIFICATE OF CORRECTION

| | |
|---|---|
| PATENT NO. | : 9,749,136 B2 |
| APPLICATION NO. | : 13/404440 |
| DATED | : August 29, 2017 |
| INVENTOR(S) | : Leddy et al. |

It is certified that error appears in the above-identified patent and that said Letters Patent is hereby corrected as shown below:

In the Claims

Claim 2, Column 15, Line 46:
Before "request", please delete "first".

Signed and Sealed this
Twenty-eighth Day of February, 2023

Katherine Kelly Vidal
*Director of the United States Patent and Trademark Office*